(12) United States Patent
Pillay-Esnault

(10) Patent No.: US 10,372,775 B2
(45) Date of Patent: Aug. 6, 2019

(54) ANONYMOUS IDENTITY IN IDENTITY ORIENTED NETWORKS AND PROTOCOLS

(71) Applicant: Futurewei Technologies, Inc., Plano, TX (US)

(72) Inventor: Padmadevi Pillay-Esnault, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/491,828

(22) Filed: Apr. 19, 2017

(65) Prior Publication Data

US 2017/0316106 A1    Nov. 2, 2017

Related U.S. Application Data

(60) Provisional application No. 62/329,827, filed on Apr. 29, 2016.

(51) Int. Cl.
| | | |
|---|---|---|
| *G06F 17/30* | (2006.01) | |
| *G06F 16/955* | (2019.01) | |
| *G06F 16/84* | (2019.01) | |
| *H04L 29/12* | (2006.01) | |
| *H04W 12/00* | (2009.01) | |

(52) U.S. Cl.
CPC ............ *G06F 16/955* (2019.01); *G06F 16/86* (2019.01); *H04L 61/103* (2013.01); *H04L 61/2084* (2013.01); *H04W 12/00518* (2019.01)

(58) Field of Classification Search
None
See application file for complete search history.

(56) References Cited

U.S. PATENT DOCUMENTS

| | | | |
|---|---|---|---|
| 8,966,075 B1 | 2/2015 | Chickering et al. | |
| 2012/0203856 A1 | 8/2012 | Wu et al. | |
| 2012/0320815 A1 | 12/2012 | Massena | |
| 2013/0124630 A1 | 5/2013 | Reunamaki et al. | |
| 2014/0162601 A1* | 6/2014 | Kim ..................... | H04W 12/06 455/411 |
| 2015/0024782 A1 | 1/2015 | Edge | |

(Continued)

FOREIGN PATENT DOCUMENTS

| | | |
|---|---|---|
| CN | 102045314 A | 5/2011 |
| CN | 102075937 A | 5/2011 |

(Continued)

OTHER PUBLICATIONS

Farinacci, et al., "LISP EID Anonymity," draft-farinacci-lisp-eid-anonymity-01, Oct. 31, 2016, 8 pages.

(Continued)

*Primary Examiner* — Diane L Lo
(74) *Attorney, Agent, or Firm* — Conley Rose, P.C.

(57) ABSTRACT

A method of using ephemeral identifiers (IDs) in a network implemented a network element (NE) comprises obtaining ephemeral ID for at least one user equipment (UE) accessible by the NE, wherein the ephemeral ID is a temporary and recyclable ID associated with the UE, transmitting a request to map the ephemeral ID of the UE to a locator of the NE to a mapping server, and establishing a communication session between the UE and a network site using the ephemeral ID.

20 Claims, 9 Drawing Sheets

(56) References Cited

U.S. PATENT DOCUMENTS

| | | | |
|---|---|---|---|
| 2016/0182497 A1* | 6/2016 | Smith | H04L 63/0853 |
| | | | 713/156 |
| 2017/0054692 A1* | 2/2017 | Weis | H04L 63/0428 |
| 2017/0316106 A1 | 11/2017 | Pillay-Esnault | |
| 2018/0139133 A1* | 5/2018 | Makhijani | H04L 45/741 |
| 2018/0227301 A1 | 8/2018 | Maruyama et al. | |
| 2018/0253738 A1 | 9/2018 | Benson | |

FOREIGN PATENT DOCUMENTS

| | | |
|---|---|---|
| CN | 104823471 A | 8/2015 |
| EP | 1492306 A2 | 12/2004 |

OTHER PUBLICATIONS

Farinacci, et al., "The Locator/IDs Separation Protocol (LISP)," RFC 6830, Jan. 2013, 75 pages.

Machine Translation and Abstract of Chinese Publication No. CN102075937, May 25, 2011, 11 pages.

Foreign Communication From a Counterpart Application, PCT Application No. PCT/CN2017/081216, International Search Report dated Jun. 30, 2017, 4 pages.

Farinacci, D., et al., "LISP EID Anonymity," XP015112981, draft-farinacci-lisp-eid-anonymity-00, May 6, 2016, 8 pages.

Rui, T., et al., "Network Access Control Mechanism based on Locator/Identifier Split," XP031505400, IEEE International Conference on Networking, Architecture, and Storage, 2009, pp. 171-174.

Yan, Z., et al., "A Novel Mobility Management Mechanism Based on an Efficient Locator/ID Separation Scheme," XP031570381, First International Conference on Future Information Networks, 2009, 6 pages.

Orava, P., et al., "Temporary MAC Addresses for Anonymity," XP040383750, IEEE P802.11, Wireless LANs, Jun. 2002, 17 pages.

Foreign Communication From A Counterpart Application, European Application No. 17788703.1, Extended European Search Report dated Feb. 22, 2019, 9 pages.

Chunduri, et al., "Identity Use Cases in IDEAS," draft-ccm-ideas-identity-use-cases-01, Jul. 3, 2017, 10 pages.

Clemm, et al., "Originator-Based Network Restraint System for Identity-Oriented Networks,", U.S. Appl. No. 15/639,976 filed Jun. 30, 2017, 36 pages.

Moskowitz, et al., "Host Identity Protocol Version 2 (HIPv2)," RFC 7401, Apr. 2015, 128 pages.

Pillay-Esnault, et al., "Identifier-Based Firewalls in Identity-Oriented Networks," U.S. Appl. No. 62/511,579, filed May 26, 2017, 14 pages.

Postel, "Darpa Internet Program Protocol Specification," Information Sciences Institute, RFC 791, Sep. 1981, 50 pages.

Office Action dated Mar. 21, 2019, 20 pages, U.S. Appl. No. 15/924,919 filed Mar. 19, 2018.

Pillay-Esnault, Ed., et al., "Problem Statement for Identity Enabled Networks," draft-padma-ideas-problem-statement-01, Mar. 12, 2017, 15 pages.

Pillay-Esnault, Ed., et al., "Requirements for Generic Resilient Identity Services in Identity Enabled Networks," draft-padma-ideas-req-grids-00, Mar. 13, 2017, 15 pages.

Herbert, T., et al., "Identifier-locator addressing for IPv6," draft-herbert-nvo3-ila-04, Mar. 13, 2017, 39 pages.

Kompella, K., et al., "Link Bundling in MPLS Traffic Engineering (TE)," RFC 4201, Oct. 2005, 12 pages.

Raza, K., et al., "Controlling State Advertisements of Non-negotiated LDP Applications," RFC 7473, Mar. 2015, 15 pages.

Farinacci, D., et al., "LISP EID Anonymity," draft-farinacci-lisp-eid-anonymity-02, Apr. 12, 2017, 9 pages.

Chunduri, U., et al., U.S. Appl. No. 15/833,180, Title: "Receiver Directed Anonymization of Identifier Flows in Identity Enabled Networks," Filing date: Dec. 6, 2017.

* cited by examiner

400

| UEs 403 | EIDs 406 | Anonymity Data 409 | | | | |
|---|---|---|---|---|---|---|
| User Equipment 1 | 421 EID1 | EEIDa | EEIDb | EEIDb | EEIDd | EEIDe |
| | | T1-T2 | T3-T4 | T5-T6 | T7-T8 | T9-T10 |
| | | RLOCa | RLOCa | RLOCc | RLOCd | RLOCe |
| User Equipment 2 | EID2 | EEIDf | EEIDg | 415 | EEIDh | EEIDi — 419 |
| | | T1-T2 | T3-T4 | T5-T6 | T7-T8 | T9-T10 |
| | | RLOCf | RLOCb | | RLOCc | RLOCg |
| User Equipment 3 | 418 423 EID3 | EEIDi | EEIDa | EEIDk | EEIDl | EEIDf |
| | | T1-T2 | T3-T4 | T5-T6 | T7-T8 | T9-T10 |
| | | RLOCh | RLOCi | RLOCa | RLOCd | RLOCc |
| User Equipment 4 | EID4 430 | EEIDm | EEIDn | EEIDo | | |
| | | EEIDk | | | | |
| | | T1-T2 | T3-T4 | T5-T6 | T7-T8 | T9-T10 |
| | | RLOCr | RLOCi | RLOCh | | |

412 brackets User Equipment 1 rows

FIG. 4

ANONYMOUS IDENTITY IN IDENTITY ORIENTED NETWORKS AND PROTOCOLS

CROSS-REFERENCE TO RELATED APPLICATIONS

The present application claims benefit of U.S. Provisional Patent Application No. 62/329,827 filed Apr. 29, 2016 by Padmadevi Pillay-Esnault, et al. and entitled "Anonymous Identity In Identity Oriented Networks And Protocols," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, the Internet widely uses Internet Protocol (IP) addresses nodes. An IP address is a numerical label assigned to each device (e.g., computer, printer) participating in a computer network that uses the Internet Protocol for communication. An IP address serves two principal functions: host or network interface identification and location addressing. Two versions of the IP are in use: IP Version 4 (IPv4) and IP Version 6 (IPv6). Therefore, an IP address serves to identify both the location and an identity of a node. However, such IP semantics are problematic because when nodes, such as a user equipment (UE), moves from one location to the next, the IP address cannot remain the same. The moving of the UE without changing the IP address to account for the new location results in a sudden loss of an established connection session. Therefore, it is difficult to implement mobility of nodes in a network utilizing IP semantics.

SUMMARY

Typically, in identifier (ID) oriented networking, a host node, such as a UE, is addressed using an ID of the host node and a location of the host node. The ID used to identify nodes are globally unique, or fixed, such that other nodes that want to initiate a connection with the host node can use the fixed ID to identify the location of the host node. The other node queries for the location of the host node using the fixed ID, and therefore, can always resolve the location and identity of a host node. However, there may be situations where a host node desires to remain anonymous when connecting to certain network sites or using certain applications. Embodiments of the present disclosure enable the host node to obtain one or more ephemeral IDs in addition to the fixed unique ID. Each of the ephemeral IDs are temporary and recyclable such that other nodes can use the ephemeral IDs after the host node has completed use of the ephemeral ID. In this way, a host node is identified by multiple IDs, and another node cannot easily resolve the location of the host node because the ephemeral IDs are shared among many nodes.

In one embodiment, the disclosure includes a method of using ephemeral identifiers (IDs) in a network implemented by a network element (NE), comprising obtaining, by the NE, an ephemeral ID for at least one UE accessible by the NE, wherein the ephemeral ID is a temporary and recyclable ID associated with the UE, transmitting, by the NE and to a mapping server, a request to map the ephemeral ID of the UE to a locator of the NE, and establishing, by the NE, a communication session between the UE and a network site using the ephemeral ID. In some embodiments, the disclosure further includes wherein the network is one of a Locator/ID Separation Protocol (LISP) network or a Mobility First, eXpressive Internet Architecture (XIA) network, and/or wherein the ephemeral ID is obtained from within a predetermined range of ephemeral IDs, and/or further comprising obtaining, by the NE, a fixed ID for the UE accessible by the NE, wherein the fixed ID is a globally unique ID identifying the UE, and establishing, by the NE, a second communication session between the UE and a second network site using the fixed ID, and/or further comprising establishing, by the NE, the communication session and a second communication session, wherein the second communication session is between the UE and a second network site using a second ephemeral ID, and/or further comprising receiving, by the UE, a confirmation from the mapping server after the mapping server successfully maps the ephemeral ID to the locator of the NE, and/or wherein the network implements LISP, and wherein ephemeral ID is an End Point Identifier (EID) and the locator is a Routing Locator (RLOC).

In one embodiment, the disclosure includes a UE operably coupled to a router in a network, comprising a memory, and a processor operably coupled to the memory and configured to obtain an ephemeral ID from within a predetermined range of available ephemeral IDs, wherein the ephemeral ID is a temporary and recyclable ID of the UE, request that a mapping server register the ephemeral ID to a locator associated with the router, and establish a communication session between the UE and a network site using the ephemeral ID. In some embodiments, the disclosure further includes wherein the ephemeral ID is an ephemeral End Point Identifier Address (EEID) or an ephemeral globally unique identifier (EGUID), and/or wherein the UE is only permitted to use the ephemeral ID for the communication session between the UE and the network site such that a second UE is permitted to use the ephemeral ID for a second communication session after the communication session between the UE and the network site has terminated, and/or wherein the network implements LISP, and wherein the mapping server comprising a memory configured to store locator-to-ephemeral ID mappings for a plurality of UEs in the network, and/or wherein the mapping server is a global network routing services (GNRS) device comprising a memory configured to store locator-to-ephemeral ID mappings for a plurality of UEs in the network, and/or wherein the processor is further configured to establish a second communication session between the NE and a second network site after obtaining a second ephemeral ID.

In one embodiment, the disclosure includes a NE implemented as a mapping server in a network, comprising a receiver configured to receive a plurality of IDs identifying a UE accessible using a locator of a second NE, wherein the plurality of IDs comprise at least one ephemeral ID, and wherein the ephemeral ID is a temporary and recyclable ID of the UE, a memory operably coupled to the receiver and configured to store a mapping of the locator to the plurality of IDs including the ephemeral ID, wherein the receiver is further configured to receive a request for the locator associated with the ephemeral ID to a third NE, and a transmitter operably coupled to the memory and configured to transmit one or more locators associated with one or more UEs identified by the ephemeral ID to the third NE. In some embodiments, the disclosure further includes wherein the mapping further comprises a fixed ID of the UE, wherein the fixed ID is a globally unique ID of the UE, and/or wherein the receiver is further configured to receive a request for the locator associated with the fixed ID from the third NE, and wherein the transmitter is further configured to transmit the locator of the UE in response to receiving the request comprising the fixed ID to the third NE, and/or wherein the transmitter is further configured to transmit at least two different locators associated with the ephemeral ID to the third NE, wherein the two different locators are stored in the memory of the first NE in association with the ephemeral ID, and/or wherein the network implements LISP, wherein the mapping of the locator to the plurality IDs comprises a mapping of a RLOC to an EID, and an EEID, wherein the network is a XIA, wherein the mapping of the locator to the plurality IDs comprises a mapping of an address of the second NE, a globally unique identifier (GUID), and EGUID, and/or further comprising a processor operably coupled to the memory, the receiver, and the transmitter, wherein the processor is further configured to monitor the memory to ensure that an ephemeral ID is not being used by a single UE more than a threshold number of times.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is an embodiment of an ID to locator mappings table.

DETAILED DESCRIPTION

Figure 1:
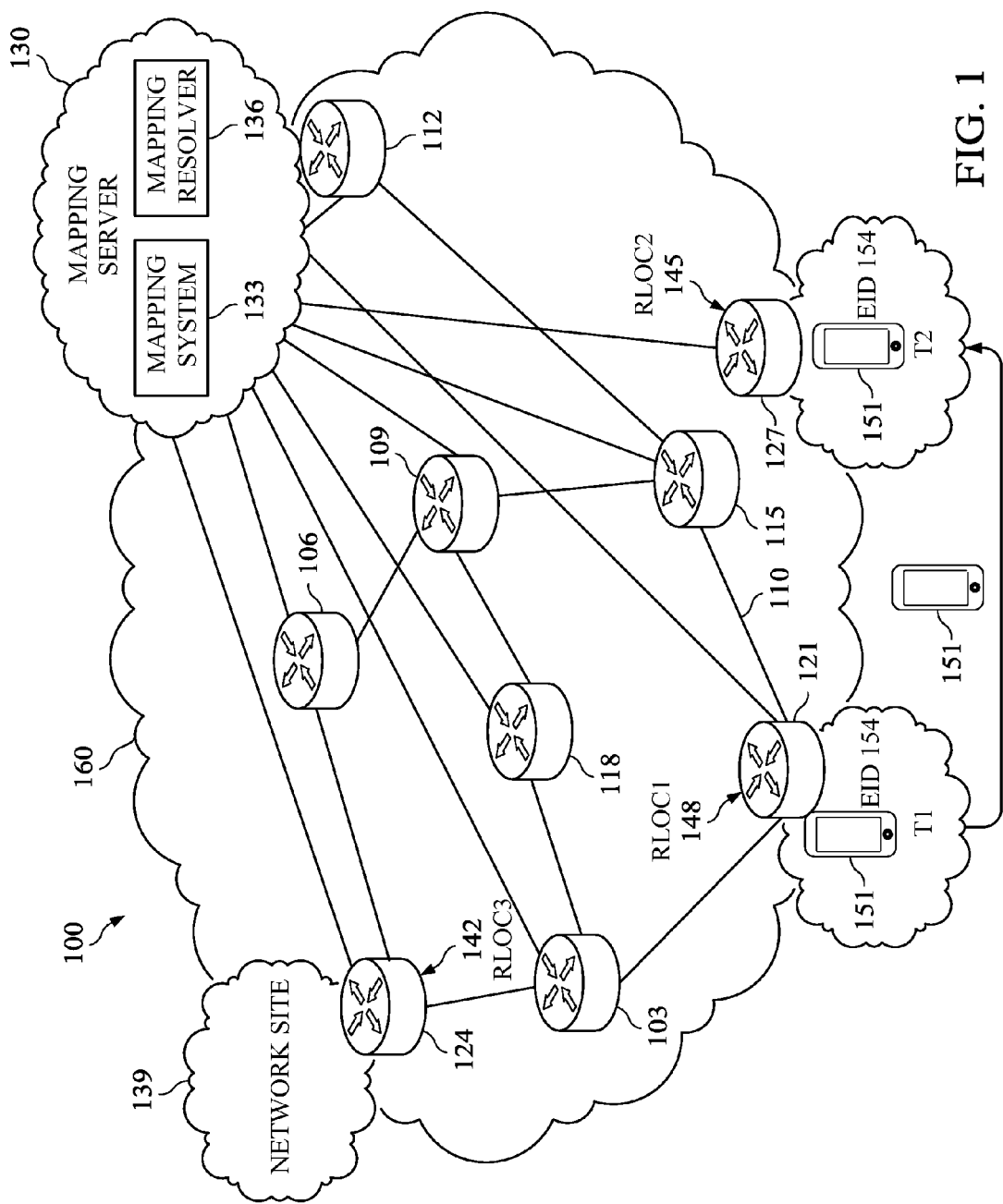
FIG. 1 illustrates an embodiment of an ID oriented network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The prior art uses a LISP to disassociate the ID and the location from a node. The LISP divides an IP address into EIDs and RLOCs, wherein the EID is used to identify a host device and the RLOC is used for the routing addressing and the data packet forwarding. The LISP is a map-encapsulation scheme, which additionally encapsulates a layer of an packet header outside the common packets. The source IP address field and the destination IP address field of an outer IP header are represented by a source RLOC and a destination RLOC respectively. The packets only need to be implemented with routing addressing and forwarding according to the destination RLOC of the outer header of the packet during the network transfer process, and the inner header of the packet remains unchanged during the transfer process.

While the EID of LISP is useful to solve the mobility issue, the EID makes nodes vulnerable to unwanted contact because the EID is a globally unique ID for a node. Indeed, a node communicating using the global EID cannot hide its identity and cannot repel unwanted traffic once paired with a locator. Thus, the global EID is vulnerable to attacks. In an attempt to address this issue, LISP has implemented some security measures (e.g., encryption of the EID). However, the EID is still widely known and anonymity cannot be guaranteed. Moreover, a hacker will likely be able to decrypt the fixed EID given enough time. Also, even a source NE encrypts an EID before establishing a communication session with a destination NE such that the encrypted EID is shielded from third parties, there is still a risk involved in using encrypted EIDs. This is because the destination NE knows the encrypted EID is associated with the source NE and can store or share the relationship between the encrypted EID and the source NE. For example, if an EID is used once between a user or host, it is possible that the user or host caches the other endpoint EID and uses the stored other endpoint EID later for tracking the EID location pairing to send unsolicited traffic.

Disclosed herein is a system and protocol that utilizes an ephemeral (e.g., short term) EID, which has a limited purpose and lifetime. As will be more fully discussed below, the ephemeral EID permits users to remain anonymous if they have the desire to do so. For example, while a user may be comfortable sharing their identity with their bank or another trusted entity, they may not be comfortable sharing their identity with a social media site or an untrusted entity. Therefore, embodiments of the present disclosure enable a user to communicate with an untrusted entity using a temporary and recyclable ephemeral ID instead of the globally unique ID. The ephemeral ID may be recycled and shared across a large base of users to provide anonymity. Also, once the ID is known in conventional systems, the physical location can de deduced. The inventive concepts disclosed herein ensure that the location of the user is not revealed.

Several examples illustrating embodiments of the disclosure are described in the context of LISP architecture. However, the embodiments of the disclosure are not meant to be limited to that context. Indeed, the inventive concepts disclosed herein are extensible to any ID-oriented architecture that makes use of an ID (e.g., XIA, and so on) as would be recognized by one skilled in the art.

FIG. 1 illustrates an embodiment of an ID oriented network 100. For example, the ID oriented network 100 may be a LISP network, or any other ID oriented network that would be recognized by one of ordinary skill in the art. LISP may be implemented according to RFC 6830, titled "The Locator/ID Separation Protocol," dated January 2013, which is hereby incorporated by reference in its entirety. ID oriented network 100 generally comprises a plurality of routers 103, 106, 109, 112, 115, and 118, and a plurality of endpoint routers (xTRs) 121, 124, and 127. For example, routers 103, 106, 109, 112, 115, 118 may be IP routers or label switch routers (LSRs) that are configured to interconnect xTRs 121, 124, and 127. In an embodiment, the routers 103, 106, 109, 112, 115, and 118 may be a root router, one or more provider edge (PE) routers, one or more source PE routers, one or more rendezvous point (RP) PE routers, one or more customer edge (CE) routers, or one or more core routers. For example, at least one of routers 103, 106, 109, 112, 115, and 118 may be a receiver PE router, a CE router, and/or a source PE router, which is configured to form an interface between the service provider network 160 and one or more CE routers. The routers 103, 106, 109, 112, 115, and 118 may each be a device configured to forward data packets within a network and/or between multiple networks. For example, router 118 may be a router within a service provider network 160 and may be configured to form a portion of a backbone or core for the service provider network 160.

Additionally, the routers 103, 106, 109, 112, 115, and 118 and the xTRs 121, 124, and 127 may be interconnected and in data communication with each other via one or more links 110 (e.g., a wireless link or a wired link). Further, the network 100 is configured to employ an IP or non-IP protocol as would be appreciated by one of ordinary skill in the art upon viewing this disclosure. In an embodiment, xTRs 121, 124, and 127 may comprise a local EID-to-RLOC mapping table and/or or an EEID-to-RLOC mapping table, as will be further discussed below.

In an embodiment, one or more of xTRs 121, 124, and 127 may generally be characterized as a PE router where a source (e.g., host) is located on or behind. For example, network site 139 may be the source or host behind xTR 124. Each of the routers 103, 106, 109, 112, 115, and 118 and xTRs 121, 124, and 127 may be configured to employ a routing table, forwarding table, network table, or the like, to control and/or direct data traffic for a given network. For example, each of the routers may generate or establish a routing table to coordinate data communication with other routers within the ID oriented network 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure.

The ID oriented network 100 also includes a mapping server 130, which includes a mapping system 133 and a mapping resolver 136. The mapping server 130 may be connected to routers 103, 106, 109, 112, 115, and 118 and xTRs 121, 124, and 127 via links 110. The mapping server 130 may be a device that registers EIDs, advertises EIDs, and aggregates EIDs into one centralized consolidated database so that NEs over various geographic areas can locate a UE associated with an EID. In an embodiment, a mapping system 133 stores EID-to-RLOC mappings of all the UEs and network sites in network 100. In an embodiment, the mapping system 133 also stores EEID-to-RLOC mappings of all the UEs and network sites in network 100. For example, the mapping system 133 may be stored in a memory of the mapping server 130. In an embodiment, the routers 103, 106, 109, 112, 115, and 118 and xTRs 121, 124, and 127 may send a map request to a mapping resolver 136 to access the mapping system to identify a current location associated with an EID. In an embodiment, the mapping system 133 and mapping resolver 136 are co-located within a single mapping server 130.

In the embodiment in which ID oriented network 100 implements a LISP protocol, routers 103, 106, 109, 112, 115, and 118, and xTRs 121, 124, and 127 are tunnel routers. The LISP network 100 utilizes the name space handling that includes EIDs and RLOC addresses. An EID is allocated to a host from an EID-prefix block associated with the site (e.g., xTR 121, 124, 127) where the host is located. The EIDs are identifiers that may have any format, such as an alphanumeric format. Each EID (e.g., EID 154) identifies a UE 151 such as, for example, a mobile phone, tablet, other mobile communications device, an xTR, router, or a LISP site. An EID is an identifier used in the inner header of a LISP packet.

The RLOC addresses are the IP addresses of various routers and nodes (e.g., xTRs 121, 124, and 127) in the LISP network 100 by which a UE 151 is accessible. For example, the EID of the network site 139 maps to RLOC 142, and EID 154 maps to either RLOC 148 or RLOC 145 depending on the location of a UE 151 at a specific time (e.g., T1 or T2). The RLOC addresses are routable addresses and reachability is through the usual IP protocols, routing tables, and so on. The RLOC addresses are location-based. Each EID maps to one or more RLOCs.

When the ID oriented network 100 implements LISP, the network site 139 and/or the xTRs 121, 124, and 127 may be an ingress tunnel router (ITR) and/or an egress tunnel router (ETR). The ITR is a LISP site edge device responsible for mapping a destination ID to the destination RLOC. The ITR encapsulates packets and forwards them to the other LISP sites or may simply forward the packets if the destination uses traditional IP. The ITR does not set up any tunnels or perform similar functionality. Rather, the ITR performs only mapping and encapsulation functions. The ETR is a LISP site edge device that receives packets from the core network (IP), decapsulates (a.k.a., unencapsulates) the LISP packets, and forwards the packets to the user device associated with the local destination EID. In an embodiment, the xTRs 121, 124, and 127 may be a router that has a combination of both ingress and egress functions.

According to LISP, each xTR identifies the EIDs that are accessible by the xTR and sends the EIDs in addition to the RLOC of the xTR to the mapping server 130. The mapping system 133 in the mapping server 130 adds entries for each of the EIDs such that each EID is stored in association with an RLOC by which the UE behind the EID can be reached (EID-to-RLOC mapping). The mapping resolver 136 may respond to queries sent by ITRs requesting the RLOC for a specified EID. The mapping server 130 is typically centralized within network 100.

As shown in FIG. 1, the EID 154 is an identifier assigned to UE 151 and is associated at time T1 with xTR 121. In this way, EID 154 maps to RLOC1 148 at time T1. When UE 151 moves from a location associated xTR 121 (at time T2) to a location associated with xTR 127 (at time T2), the EID 154 of UE 151 remains unchanged. However, UE 151 is associated with a different RLOC, RLOC2 145, at T2. For example, when a UE moves locations, the EID of the UE remains the same while the RLOC changes.

Once UE 151 has moved, xTR 127 may send a map register message to the mapping server 130 indicating that the EID 154 for UE 151 now maps to RLOC2 145. The mapping system 133 is updated to reflect the change in the RLOC for EID 154 such that any other UE that wants to initiate a session with UE 151 can request the RLOC of UE 151 using EID 154. For example, typically, an EID must be globally unique. While the global uniqueness of an EID is useful to handle the location separation of mobility and movement of nodes, the global uniqueness of an EID makes a UE vulnerable to unwanted contact. A global EID cannot hide its identity nor repel unwanted traffic once an EID is paired with an RLOC at the mapping server 130. There is no restraint on access to resolve any EID and, therefore, anonymity cannot be guaranteed for a UE. In addition, the ability to send traffic to a specific EID cannot be prevented if the EID is known at some time by any other entity in a network, regardless of whether the EID is encrypted.

Disclosed herein are embodiments that enable users to be anonymous should they desire for certain applications or communications sessions through the use of an ephemeral ID, which has a limited purpose and lifetime. Furthermore, the ephemeral ID is recycled and shared across a large base of users over an extensive geographic area, ensuring anonymity.

Figure 2:
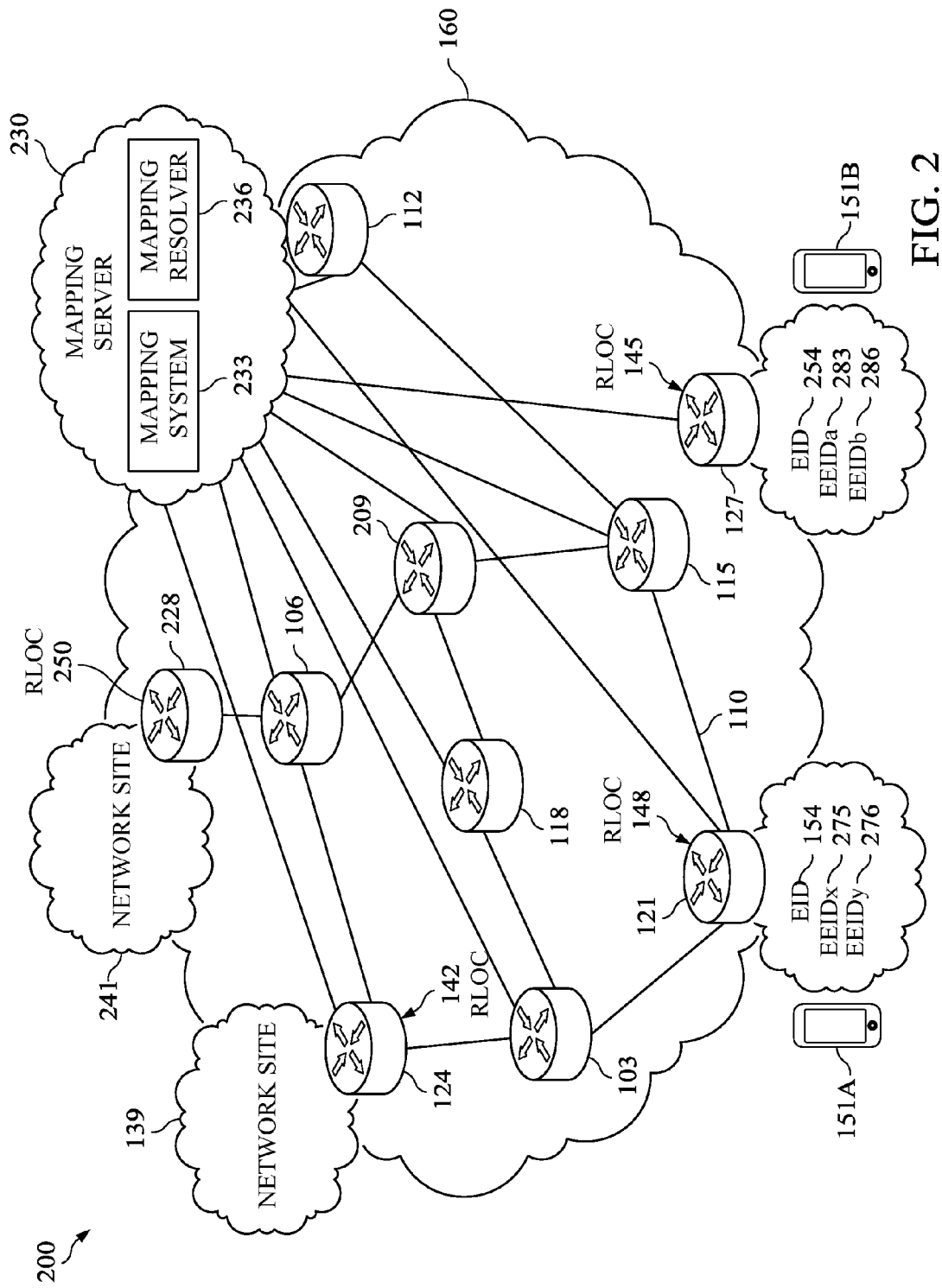
FIG. 2 illustrates an embodiment of an ID oriented network in which ephemeral IDs are utilized.

FIG. 2 illustrates an embodiment of an ID oriented network 200 in which ephemeral IDs are utilized. The ID oriented network 200 may be a LISP network, such as network 100, or any other ID oriented network that would be recognized by one of ordinary skill in the art. An ephemeral ID may be an EEID. ID oriented network 200 is structured similar to ID oriented network 100, except that ID oriented network 200 includes an additional network site 241 with a corresponding xTR 228 and two UEs 151A and 151B. Otherwise, ID oriented network 200 includes routers 103, 106, 109, 112, 115, and 118. ID oriented network 200 also includes xTRs 121, 124, 127, and 228, which is structured similar to and operate similar to xTRs 121, 124, and 127 of FIG. 1. The mapping server 230, mapping system 233, and mapping resolver 236 are similar to the mapping server 130, mapping system 133, and mapping resolver 133, except that the mapping server 230, mapping system 233, and mapping resolver 236 include additional ephemeral ID data.

UE 151A is designated with EID 154 as the globally unique identifier that exclusively identifiers UE 151A. Similarly, UE 151B is designated with EID 254 as the globally unique identifier that exclusively identifies UE 151B. UE 151A is accessible by xTR 121, which is associated with RLOC 148. UE 151B is accessible xTR 127, which is associated with RLOC 145. The mapping system 233 includes an EID-to-RLOC mapping entry for EID 154 and RLOC 148 and an EID-to-RLOC mapping entry for EID 254 and RLOC 127. Therefore, when any requesting NE, such as a UE or network site, wants to initiate a connection with either UE 151A or UE 151B, the NE merely has to query to mapping server 230 using the EID 154 or EID 254 to identify the RLOC by which the UE can be reached. However, there may be situations where UEs 151A and 151B do not want to be universally identifiable or does not want to reveal the true identity of the UE. For example, when a user is communicating with a trusted site, such as bank network site, the user may need to use the true EID for authentication purposes. However, when a user is communicating with an untrusted site, such as gaming network site, the user may not need to and may not desire to use the true EID to merely play the game.

The present disclosure enables a user to use ephemeral IDs, such as an EEID, instead of the EID when the user does not desire to reveal a true identity of the UE. As shown in FIG. 2, UE 151A is not only associated with EID 154, but also EEIDx 275 and EEIDy 276. Similarly, UE 151B is not only associated with EID 254, but also EEIDa 283 and EEIDb 286. Although only two EEIDs are shown for each of UEs 151A and 151B, it should be appreciated that a UE may obtain any number of EEIDs as needed. UE 151A may obtain EEIDx 275 and EEIDy 276 in various different ways. In an embodiment, UE 151A may independently generate EEIDx 275 at a certain time and generate EEIDy 276 at another time. In an embodiment, UE 151A may receive EEIDx 275 and EEIDy 276 from the mapping server 230 at a single time or at different times. Similarly, UE 151B may also obtain EEIDa 283 and EEIDb 286 by either generating EEIDa 283 and EEIDb 286 or receiving EEIDa 283 and EEIDb 286 from the mapping server 230. In an embodiment, EEIDx 275 and EEIDy 276 may be generated by any of the devices in the network. In an embodiment, an EEID generated by the xTR associated with the UE identified by the EEID. For example, EEIDx 275 and EEIDy 276 may be generated by the xTR 121 associated with the UE 151A, and EEIDa 283 and EEIDb 286 may be generated by the xTR 127 associated with UE 151B.

For example, suppose network site 139 is associated with a trusted bank site, and UE 151A wants to initiate a connection with network site 139. In this scenario, UE 151A may send packets to network site 139 carrying the EID 154 as the source ID in the inner header. However, suppose network site 241 is an untrusted searching site, and UE 151A wants to initiate a connection with network site 241. In such a case, UE 151A may send packets to network site 241 carrying EEIDx 275 as the source ID in the inner header.

In an embodiment, EEIDs 275, 276, 283, and 286 are not globally unique identifiers assigned to the UEs. Instead, the EEIDs 275, 276, 283, and 286 are temporary and recyclable. An EEID 275, 276, 283, and 286 is temporary in the sense that a particular EEID is only designated to a UE for a period of time, after which the EEID is no longer designated to that UE. For example, UE 151B uses EEIDa 283 during a session with a first network site 139. After the session with the first network site 139 is terminated, the UE 151B may not be permitted to use EEIDa 283 again for a period of time. For example, once the session with the first network site 139 is terminated, UE 151B may have to wait a predetermined period of time before being permitted to use EEIDa 283 again. As another illustrative example, UE 151B may only be permitted to use EEIDb 286 for an allotted period of time. After the allotted period of time transpires, UE 151B may not be permitted to use EEIDb 286 again for at least a period of time. This way UE 151B does not use the same EEID An EEID 275, 276, 283, and 286 is recyclable in the sense that the EEID 275, 276, 283, and 286 can be reused by another UE. For example, suppose UE 151A uses EEIDx 275 for a communication session with network site 241. After the communication session in which UE 151A uses EEIDx 275 ends, UE 151B may now use EEIDx 275 to communication with either network site 139 or 241.

In an embodiment, an EEID 275, 276, 283, and 286 may be obtained from a predetermined range or block of EEIDs, as defined by Internet Engineering Task Force (IEFT) draft, entitled "LISP EID Anonymity," by D. Farinacci and P. Pillay-Esnault, published on Oct. 13 2016, which is hereby incorporated by reference in its entirety. In an embodiment, the ephemeral EIDs are in the predetermined range or block of 2001:5::/32 when IPv6 is used, as defined by IETF draft, entitled "LISP EID Anonymity." In an embodiment, the ephemeral EIDs are in the predetermined range or block of 240.0.0.0/4 when IPv4 is used, as defined by IETF draft, entitled "LISP EID Anonymity." In an embodiment, an ephemeral ID may be an ephemeral name selected from a range of names, similar to a username. An ephemeral name selected from the range of names may be denoted using a predefined format that is universally understood as being an ephemeral ID. In an embodiment, an ephemeral name is in the predetermined range or block when the ephemeral name has a predefined prefix that is attached to the beginning of an identifier. For example, all ephemeral names with a prefix of "anon-" may be understood by other NEs as being an ephemeral ID. In an embodiment, an ephemeral name is in the predetermined range or block when the ephemeral name has a predefined appendix that is appended to the end of an identifier. For example, all ephemeral names with an appendix of "-anon" may be understood by other NEs as being an ephemeral ID. Any predefined format with any alphamerical characters may be understood by other NEs as being an ephemeral ID. Despite these examples, other ranges or blocks might be specified, changed by an operator or administrator, and utilized within the scope of this disclosure.

In an embodiment, xTRs 121, 124, 127, and 228 are configured to register EIDs and EEIDs with the mapping server 230 such that mapping server 230 maintains a globalized repository of the location of all UEs and network sites. For example, xTRs 121, 124, 127, and 228 are configured to periodically send the mapping server register messages. Each register message includes the EIDs of all the UEs or network devices that are reachable by the xTR sending the register message and the RLOC of the xTR. For example, xTR 121 sends a register message to the mapping server 230 including RLOC 148, EID 154, EEIDx 275, and EEIDy 276. Similarly, xTR 127 sends a register message to the mapping server 230 including RLOC 145, EID 254, EEIDa 283, and EEIDb 286. Mapping system 233 saves an EID-to-RLOC mapping entry indicating that RLOC 148 is a locator for EID 154, EEIDx 275, and EEIDy 276. Mapping system 233 saves another EID-to-RLOC mapping entry indicating that RLOC 145 is a locator for EID 254, EEIDa 283, and EEIDb 286. In these embodiments, UEs are associated with multiple different IDs instead of one globally unique ID, thereby making it difficult for other UEs to obtain an accurate identifier of a UE or network site. This allows for UEs and network sites to maintain some level of anonymity across a network 200.

Figure 3:
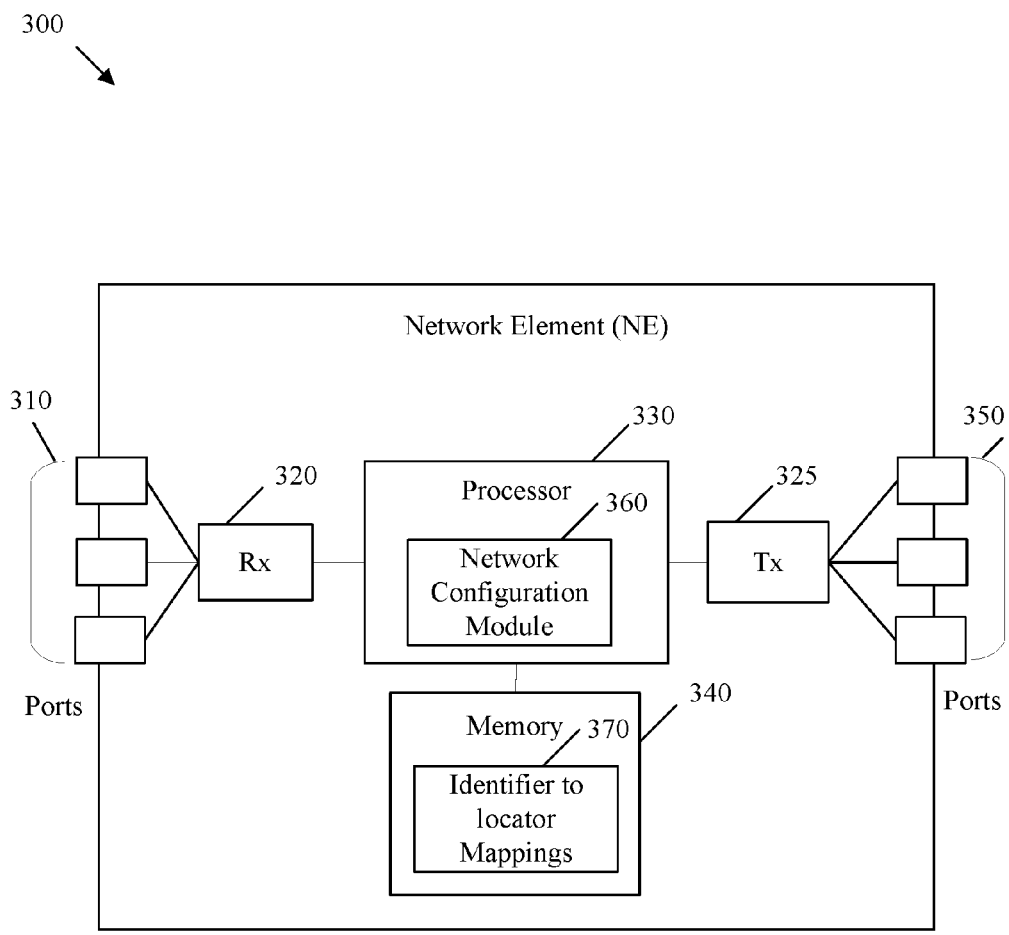
FIG. 3 is a schematic diagram of an embodiment of NE in an ID oriented network.

FIG. 3 is a schematic diagram of an embodiment of NE 300 in an ID oriented network, such as the networks 100 and 200. For instance, the NE 300 may be a UE, such as the UE 151A or 151B, a network site, such as the network site 139 or 241, a mapping server, such as mapping server 230, or an xTR, such as xTRs 121, 124, 127, or 228. The NE 300 may be configured to implement and/or support the anonymity mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, a transmitter unit (Tx) 325 and one or more egress ports 350 for transmitting the data, and a memory 340 for storing the data.

The processor 330 may comprise one or more multi-core processors and coupled to a memory 340, which may function as data stores, buffers, etc. The processor 330 may be implemented as a general processor or may be part of one or more application specific integrated circuits (ASICs) and/or digital signal processors (DSPs). The processor 330 may comprises a network configuration module 360, which may perform processing functions of a UE, such as the UE 151A or 151B, a network site, such as the network site 139 or 241, a mapping server, such as mapping server 230, or an xTR, such as xTRs 121, 124, 127, or 228, and implement message sequence diagram 600 methods 800 and 900, as discussed more fully below, and/or any other method discussed herein. As such, the inclusion of the network configuration module 360 and associated methods and systems provide improvements to the functionality of the NE 300. Further, the network configuration module 360 effects a transformation of a particular article (e.g., the network) to a different state. In an alternative embodiment, network configuration module 360 may be implemented as instructions stored in the memory 340, which may be executed by the processor 330.

The memory 340 may comprise a cache for temporarily storing content, e.g., a random-access memory (RAM). Additionally, the memory 340 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof The memory 340 may be configured to store routing tables and/or EID-to-RLOC mappings. In an embodiment, the memory 340 may comprise ID to locator mappings 370. The details of the ID to locator mappings 370 will be discussed more fully below.

It is understood that by programming and/or loading executable instructions onto the NE 300, at least one of the processor 330 and/or memory 340 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

FIG. 4 is an embodiment of an ID to locator mappings table 400. In an embodiment, the ID to locator mappings table 400 is similar to the ID to locator mappings 370 stored at memory 340. In an embodiment, the locator to mappings table 400 is an example of at least a portion of a mappings table stored at a memory of the mapping system 230 or locally in xTRs 121, 124, 127, or 228.

The ID to locator mappings table 400 includes column for UEs 403, a column for EIDs 406, and multiple columns for anonymity data 409. The column for UEs 403 may, for example, identify an owner of an UE. The column for UEs 403 may not actually be needed in addition to the column for EIDs. However, the column for UEs 403 is included here for illustrative purposes. The column for EIDs 406 includes values of EIDs. The EIDs included in column 406 may be the globally unique EID assigned to each UE, such as EID 154 and EID 254. The columns for anonymity data 409 indicate the RLOCs that are associated with various EEIDs at various time intervals.

For example, section 412 of the ID to locator mappings table 400 indicates that the UE1 associated with EID1 also uses different EEIDs and a fixed EID. For example, UE1 uses EEIDa and can be reached using RLOCa from the time interval T1-T2. UE1 also uses EEIDb and can be reached using RLOCa from the time interval T3-T4. Similarly, UE1 uses EEIDb and can be reached using RLOCc from the time interval T5-T6. Therefore, a UE can use the same EEIDs at different times at different locations. UE1 also uses EEIDd and can be reached using RLOCd from the time interval T7-T8. Similarly, UE1 also uses EEIDe and can be reached using RLOCe from the time interval T9-T10. While using all the various EEIDs, UE1 is still always associated with the globally unique EID1.

The anonymity data for UE2 is similar the anonymity data for UE1. UE2 is also associated with different EEIDs at different times, and each EEID is associated with a specific RLOC. However, at blocks 415, it can be seen that there may be time intervals (e.g., T5-T6) during which UE2 is not using an EEID. During this time interval, for example, UE2 may be established in a connection with a trusted site such that UE2 uses EID2 instead of an anonymous identifier.

The anonymity data for UE3 is also similar to the anonymity data for UE1. UE3 is also associated with different EEIDs at different times, and each EEID is associated with a specific RLOC. As shown in block 418, UE3 uses EEIDi at time interval T1-T2 and can be reached using RLOCh. However, as shown in block 419, UE2 also uses EEIDi, but at a different time interval of T9-T10. Thus, UE2 uses EEIDi after UE3 uses EEIDi. Therefore, the network recycled the use of EEIDi from UE3 at time interval T1-T2 to UE2 at time interval T9-T10. Similarly, as shown in block 421, EEIDa is first used by UE1 at time interval T1-T1. Subsequently, as shown in block 423, EEIDa is later used by UE3 at time interval T3-T4. Therefore, the network has recycled the use of EEIDi and EEIDa across multiple UEs. In this way, it will be difficult to map either EEIDi or EEIDa to a single device since the use of EEIDi and EEIDa is temporary. That is, UE3 is not permitted to use EEIDi after time T2. Similarly, UE1 is not permitted to use EEIDa after time T2.

The anonymity data for UE4 is also similar to the anonymity data for UE1. UE4 is also associated with different EEIDs at different times, and each EEID is associated with a specific RLOC. As shown in portion 430, UE4 uses multiple EEIDs (EEIDm and EEIDk) at the same time interval T1-T2. During this time interval of T1-T2, UE3 can be reached at RLOCr. For example, UE4 may use EEIDm for a communication session with a first untrusted network device and simultaneously use EEIDk for a communication session with a second untrusted network device. Therefore, UEs can use multiple EEIDs for different applications or communication sessions running on the UE at the same time. However, even though a UE4 is using multiple EEIDs simultaneously, the UE is still always going to be associated with the globally unique EID4.

Figure 5:
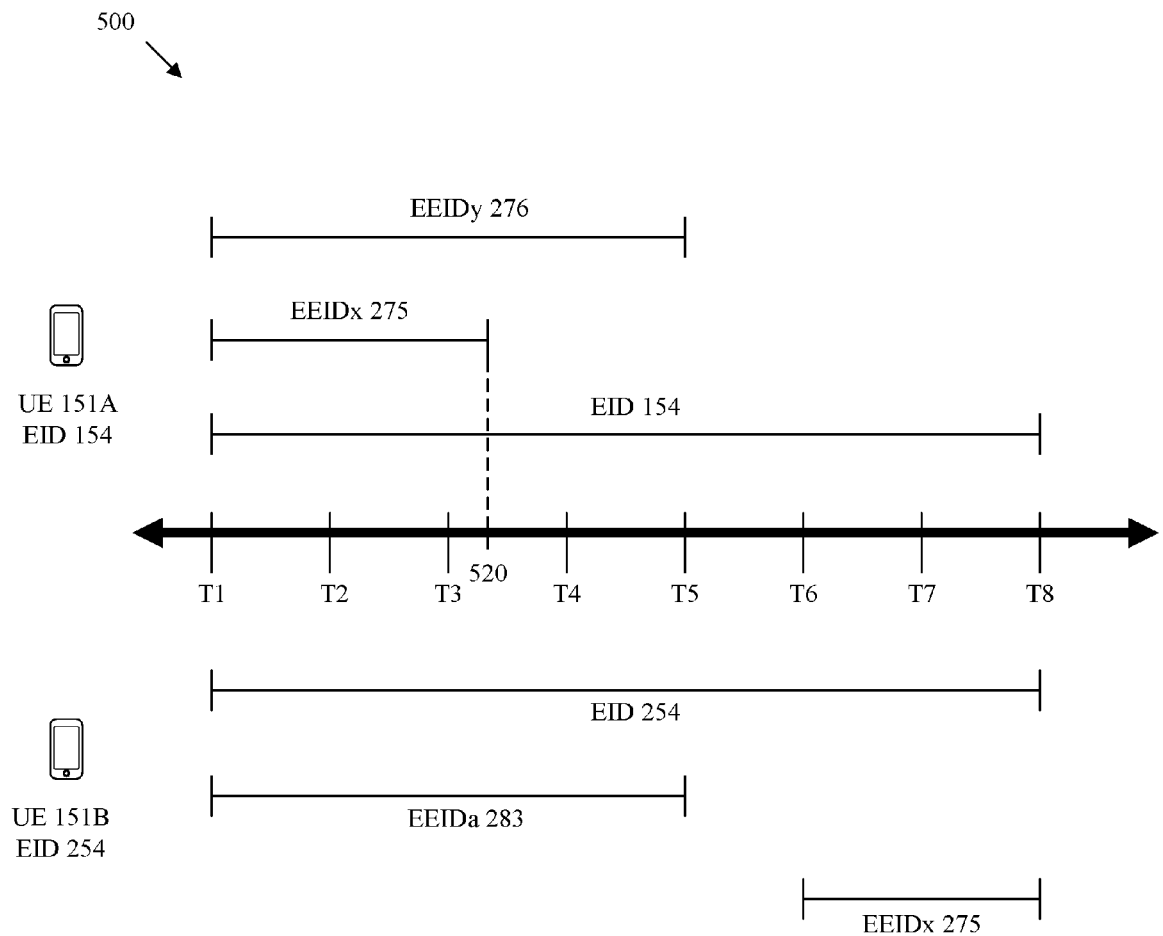
FIG. 5 is an example of a timing diagram illustrating an embodiment of a method of obtaining EEIDs.

FIG. 5 is an example of a timing diagram 500 illustrating an embodiment of a method of obtaining EEIDs. UEs 151A and 151B may be similar to NE 300. As shown in FIG. 5, UE 151A is always associated with EID 154 across times T1-T8, and EID 154 is a global identifier that uniquely identifies UE 151A. Similarly, UE 151B is always associated with EID 254 across times T1-T8, and EID 254 is the global identifier that uniquely identifies UE 151B. At time T1, UE 151A obtains EEIDx 275 as a temporary and recyclable identification of UE 151A. In an embodiment, UE 151A uses EEIDx 275 to communicate with a first network site (e.g., network site 139) from time T1 to time 520. At time 520, which is between T3 and T4, a time period for UE 151A to use EEIDx 275 is expired. In an embodiment, a permission for the UE 151A to use EEIDx 275 may be granted by an administrator or a mapping server (e.g., mapping server 230) for the time period, and when the time period expires, UE 151A may no longer use EEIDx 275. In an embodiment, the time period for UE 151A to use EEIDx 275 is the time period during which UE 151A is in a communication session with the first network site. After the communication session ends, UE 151A may no longer use EEIDx 275, and another UE may use EEIDx 275. At time T1, UE 151A also obtains EEIDy 276 as a temporary and recyclable identification of UE 151A. UE 151A uses EEIDy 276 to communicate with a second network site from time T1 to time T5.

At time T1, UE 151B obtains EEIDa 283 as a temporary and recyclable identification of UE 151B. In an embodiment, EEIDa 283 may be used specifically to communicate with the first network site from time T1 to time T5. At time T6, UE 151B obtains EEIDa 283 as another temporary and recyclable identification of UE 151B. UE 151B may use EEIDx 275 to communicate with the second network site from time T6 to T8. Therefore, UE 151A and UE 151B use the same EEIDx 275, but during different time intervals. UE 151A uses EEIDx 275 to communicate with the first network site, and UE 151B uses EEIDx 275 to communicate with the second network site. Therefore, the first network site and the second network site may assume that they are both communicating with the same UE since the EEIDx 275 that identifies the UE is the same. However, in reality, the first network site and the second network site are talking to two different UEs 151A and 151B. In this way, both UE 151A and UE 151B maintain some anonymity when communicating with various network sites.

Figure 6:
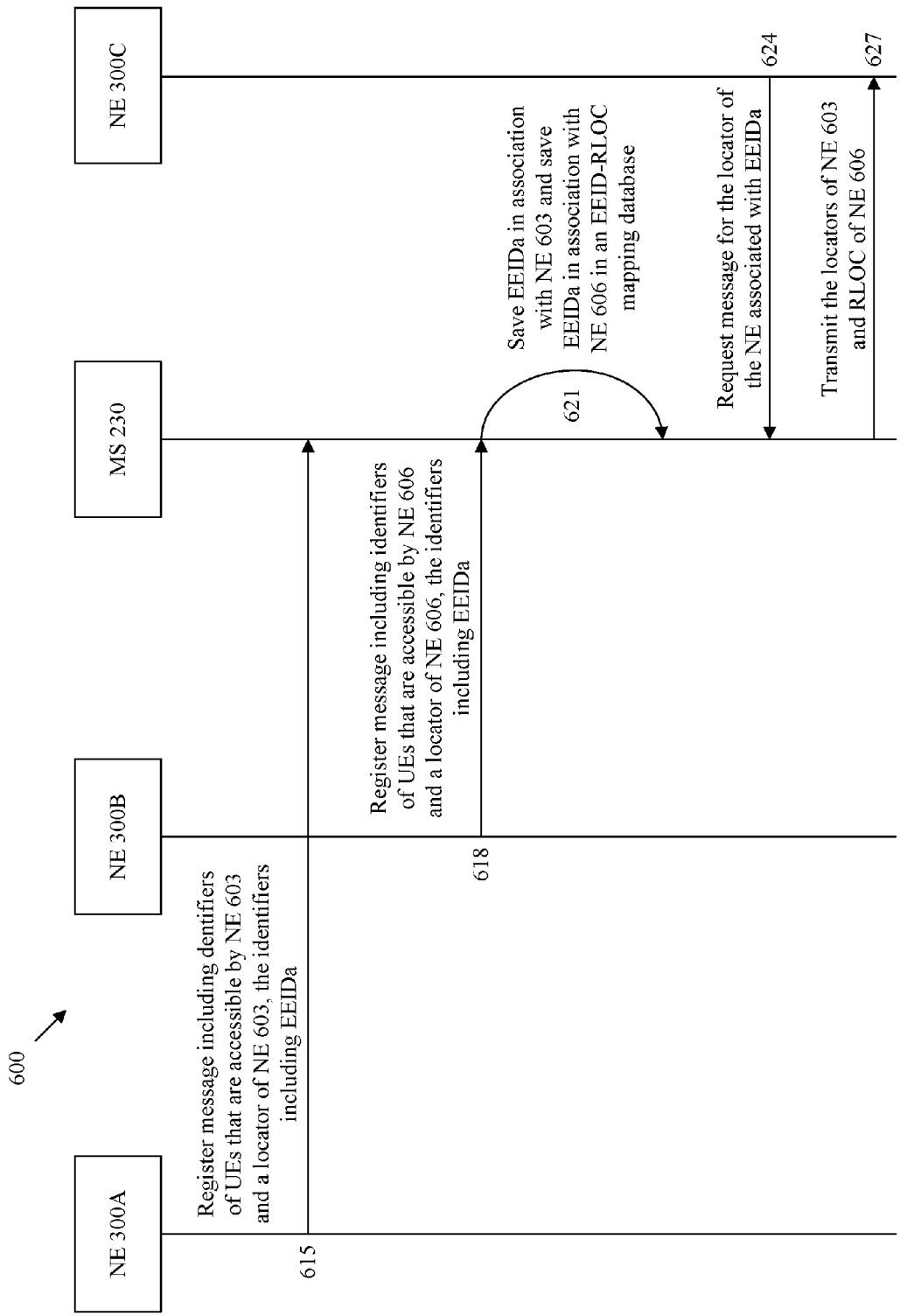
FIG. 6 is a message sequence diagram illustrating a method of maintaining anonymity in an ID oriented network.

FIG. 6 is a message sequence diagram 600 illustrating a method of maintaining anonymity in an ID oriented network, such as network 200. NE 300A, NE 300B, mapping server (labelled MS in FIG. 6) 230, and NE 300C perform the steps of the message sequence diagram 600. NE 300A-C may be similar to UEs 151A and 151B or xTRs 121, 124, 127, and 228. The message sequence diagram begins when NE 300A sends a register message to MS 230.

At step 615, NE 300A sends a register message including identifiers of UEs that are accessible by NE 300A and a locator of NE 300A. For example, NE 300A may send a map register message including EIDs for the UEs that are reachable by NE 300A, one or more EEIDs that the UEs may be using to communicate with other NEs, and an RLOC for NE 300A. For example, the register message includes multiple EIDs and EEIDs identifying one or more UEs that can be reached by NE 300A. The map register message may be structured and sent pursuant to ITEF RFC 6830 when the network implements LISP. As shown in diagram 600, the register message sent by NE 300A includes EEIDx (e.g., EEIDx 275).

At step 618, NE 300B sends a register message including identifiers of UEs that are accessible by NE 300B and a locator of NE 300B. For example, NE 300B also sends a map register message including EIDs and EEIDs of one or more UEs that can be reached by NE 300B and an RLOC of NE 300B. The register message sent by NE 300B also includes EEIDx. At step 621, MS 230 processes both the register message received from NE 300A and NE 300B. In an embodiment, MS 230 saves a locator-to-ID mapping entry indicating the EIDs and EEIDs that are accessible by the locator of NE 300A. Similarly, MS 230 saves another locator-to-ID mapping entry indicating the EIDs and EEIDs that are accessible by the locator of NE 300B. For example, MS 230 saves EEIDx in association with the RLOC of NE 300A and saves EEIDx in association with the RLOC of NE 300B.

At step 624, NE 300C sends a request message for the locator of the NE associated with EEIDx. For example, NE 300C sends a map request message the MS 230 for the RLOC of the NE associated with EEIDx. The map request message may be structured and sent pursuant to ITEF RFC 6830. At step 627, MS 230 responds to the request message by transmitting the locator of NE 300A and the locator of NE 300B to NE 300C. For example, MS 230 transmits a map reply message comprising the RLOC of NE 300A and the RLOC of NE 300B to NE 300C. The map reply message may be structured and sent pursuant to ITEF RFC 6830.

Traditionally in ID oriented networks, when NE 300C queries MS 230 for the RLOC of a specific EID, the MS is configured to transmit a current RLOC of the EID. However, embodiments of the disclosure enable a UE to be associated with not just an EID but also multiple temporary and recyclable EEIDs. In this way, when NE 300C queries for the RLOC of a specific EEIDx, the MS 230 is configured to return all the RLOCs that the EEIDx may be associated with. Therefore, NE 300C is unable to identify the actual RLOC associated with the UE using the EEIDx, thereby preserving an anonymity of the UE using EEIDx. For example, because NE 300C received both the RLOC of NE 300A and the RLOC of NE 300B, NE 300C cannot accurately identify the location of the UE using EEIDx.

Figure 7:
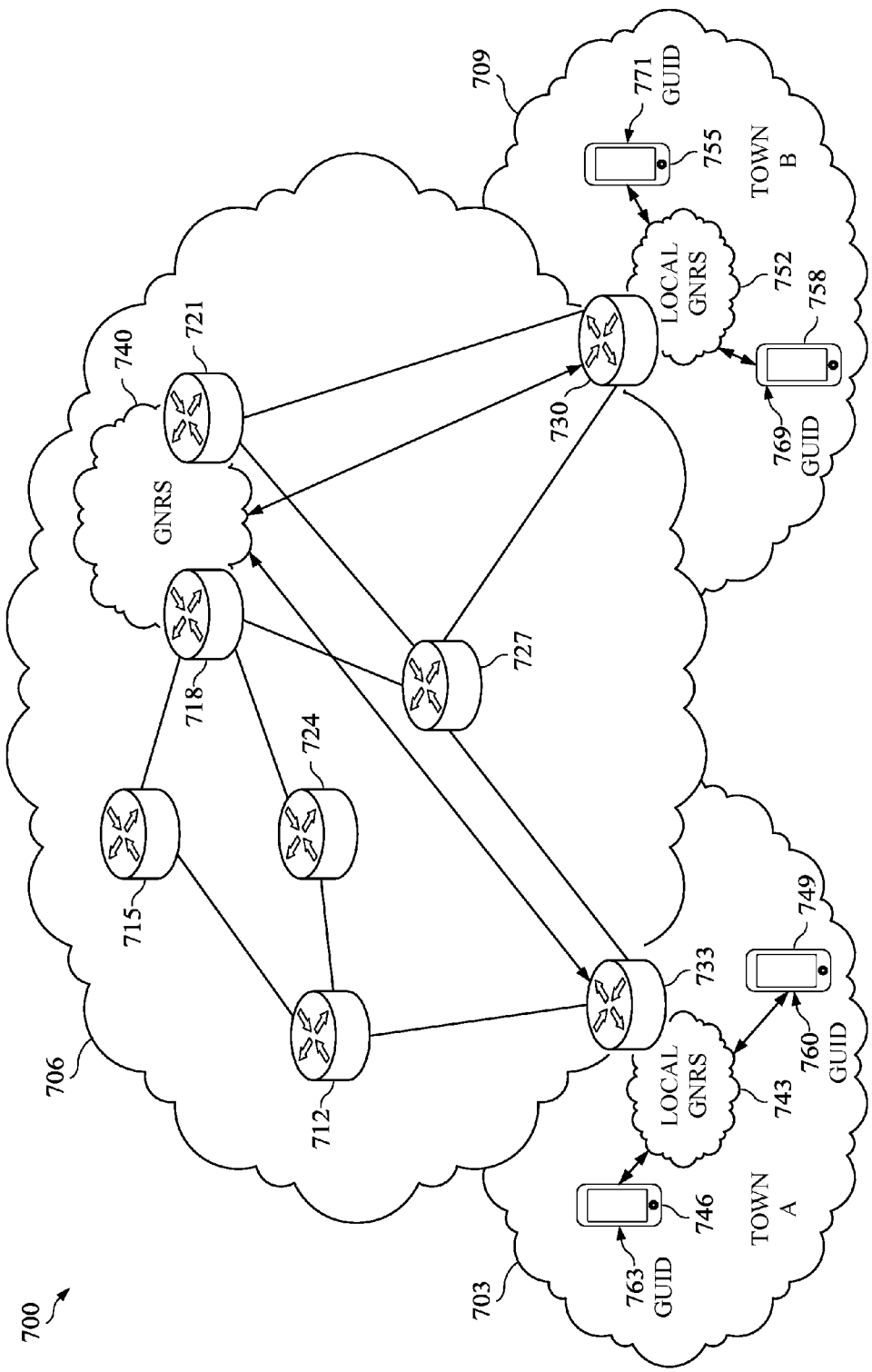
FIG. 7 illustrates an embodiment of an ID oriented network in which EEIDs are utilized.

FIG. 7 illustrates an embodiment of an ID oriented network 700 in which EEIDs are utilized. ID oriented network 700 may be a Mobility First, eXpressive Internet Architecture (XIA) network. ID oriented network 700 is structured similar to ID oriented network 200. ID oriented network 700 generally comprises three subnetworks 703, 706, and 709. Subnetwork 706 may be a centralized network comprising a plurality of routers 712, 715, 718, 721, 724, and 727, which are similar to routers 103, 106, 109, 112, 115, and 118. Subnetwork 706 also comprises a mobile nodes 730 and 733, which are similar to UEs 151A and 151B. Subnetwork 706 connects to other subnetworks 703 and 709 and comprises a centralized GNRS device 740. The centralized GNRS device 740 may be similar to the mapping server 230 in that the centralized GNRS device 740 is a centralized mapping server that stores locator to EID and EEID mappings across multiple subnetworks 703, 706, and 709.

Subnetwork 703 comprises a local GNRS device 743, a mobile node 746, and a mobile node 749. The local GNRS device 743 comprises the locator-to-EID and locator-to-EEID mappings across only subnetwork 703. For example, local GNRS device 743 only comprises the locator-to-EID and locator-to-EEID mappings for the mobile nodes 746 and 749. Subnetwork 709 comprises a local GNRS device 752, a mobile node 755, and a mobile node 758. The local GNRS device 752 also comprises the locator-to-EID and locator-to-EEID mappings across only subnetwork 709. For example, local GNRS device 752 only comprises the locator-to-EID and locator-to-EEID mappings for the mobile nodes 755 and 758. Meanwhile the centralized GNRS device 740 comprises the locator to EID and EEID mappings for mobile nodes 730, 733, 746, 749, 755, and 758.

The Mobility First network 700 may use the ephemeral name selected from a specific range of names having a predefined format. For example, the EIDs associated with the mobile nodes 730, 733, 746, 749, 755, and 758 are GUIDs. As shown in FIG. 7, mobile node 749 is associated with GUID 760, mobile node 746 is associated with GUID 763, mobile node 758 is associated with GUID 769, and mobile node 755 is associated with GUID 771. Similar to a UE's association with an EID, a mobile node may utilize a fixed or permanent GUID and one or more EGUIDs. The centralized GNRS device 740, local GNRS device 743, and local GNRS device 752 are configured to store locator-to-GUID and locator-to-EGUID mappings for the mobile nodes. Similar to the UEs 151A and 151B in network 200, mobile nodes 730, 733, 746, 749, 755, and 758 may utilize the GUID when communicating with a trusted site and utilize an EGUID when communicating with an untrusted site.

Unlike in network 200 which may employ the LISP network, when the ID oriented network 700 is a Mobility First XIA network, requests for mapping or registration are performed by one of the centralized GNRS device 740, local GNRS device 743, or local GNRS device 752. By way of example, a registration request may be sent by the mobile device associated with GUID 760 to the local GNRS device 743. If a mapping cannot be adequately performed by the local GNRS device 743 (e.g., the source and destination are not in the same geographic area, etc.), the request for registration is sent up to the centralized GNRS 740. In this way, the centralized GNRS device 740 maintains mappings for all of the mobile nodes across all of the networks.

Figure 8:
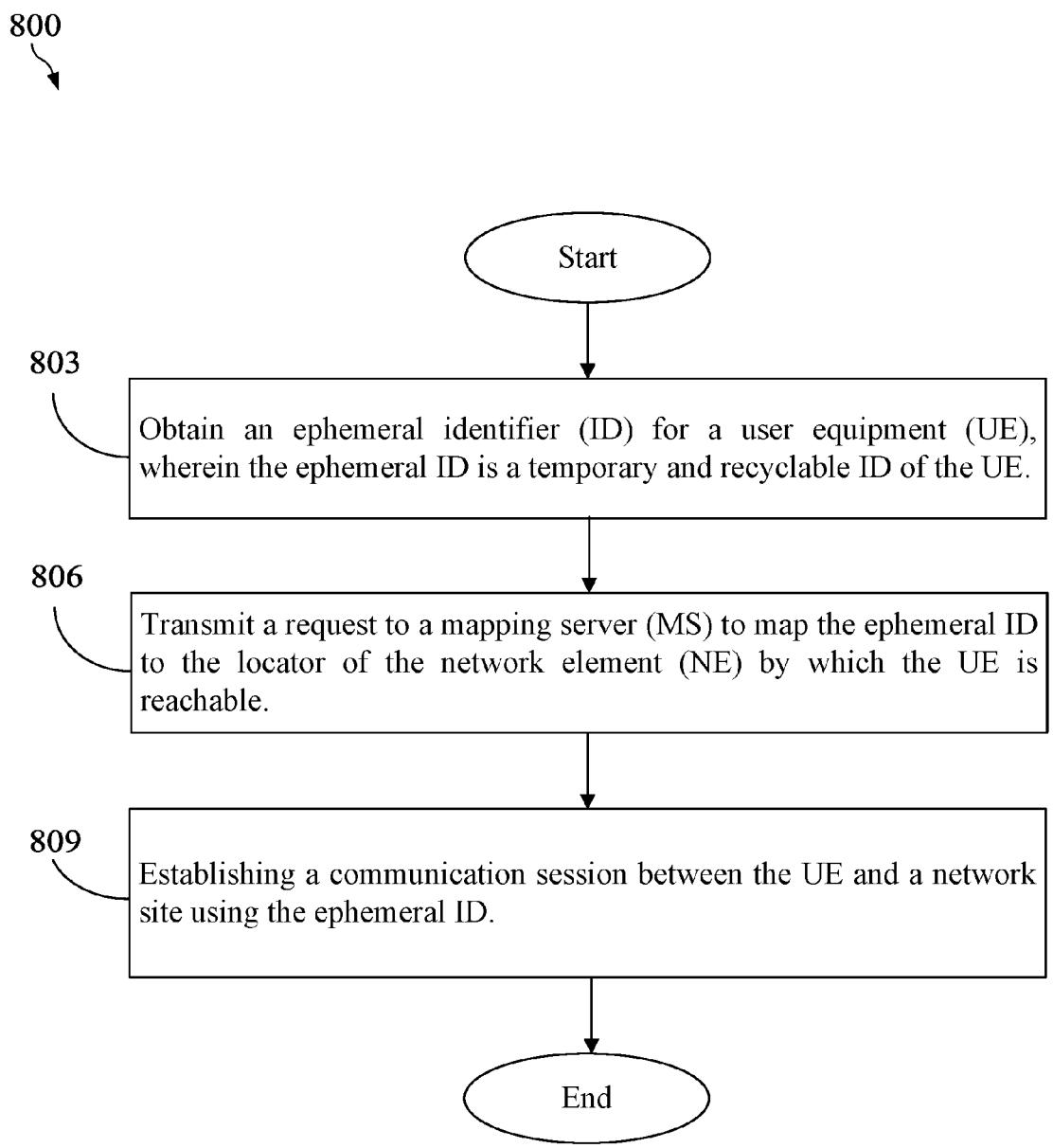
FIG. 8 is a method enabling anonymity of NEs in an ID oriented network.

FIG. 8 is a method 800 enabling anonymity of NEs in an ID oriented network. Method 800 may be implemented by an NE, similar to NE 300, in a network, similar to networks 200 or 700 when a UE communicates with a network site that is not trusted or is an unknown identity. For example, the method 800 may be utilized by an NE when the NE would like to remain anonymous or be free of unwanted contact. The NE may be a UE, such as the UE 151A or 151B, a network site, such as the network site 139 or 241, an xTR, such as xTRs 121, 124, 127, or 228, or a mobile node, such as mobile nodes 730, 733, 746, 749, 755, and 758.

At block 803, an ephemeral ID is obtained for a UE. The ephemeral ID may be similar to EEIDs or EGUIDs. The UE may be similar to UEs 151A and 151B or mobile nodes 730, 733, 746, 749, 755, and 758. For example, a processor 330 of the NE obtains the ephemeral ID for the UE. In an embodiment, the NE may be the xTR or mobile node associated with the UE. In an embodiment, the NE may be the UE itself In an embodiment, the ephemeral ID is randomly chosen from the predetermined range or block of EIDs or names noted above. In an embodiment, the ephemeral EID may be assigned to the UE by, for example, an application running on the user UE. Even so, the random ephemeral ID may also be otherwise obtained by the UE within the scope of this disclosure or any other manner described in ITEF RFC 6830.

At block 806, a request is transmitted to a mapping server to map the ephemeral ID to the locator of the NE by which the UE is reachable. For example, a Tx 325 transmits a map request to a mapping server 230 or a centralized GNRS device 740 to create an entry that maps the ephemeral ID to the locator of the NE. In an embodiment, the locator may be an RLOC, and NE by which the UE is reachable may be an xTR, such as xTRs 121, 124, 127, and 228. In an embodiment, the ephemeral ID may be assigned for a preconfigured period of time and the user may retain the same ephemeral ID for a short period of time, e.g., several minutes, one or more hours, a day, etc. However, in an embodiment, the mapping server or GNRS device purges one or several of the ephemeral IDs to prevent a single entity from monopolizing those ephemeral IDs. Such purging may be performed according to a predetermined schedule (e.g., hourly, daily etc.,), once a threshold is met, and so on. For example, a processor 330 mapping server or GNRS device may be configured to monitor the identifier to locator mappings 370 in memory 340 to ensure that an ephemeral ID is not being used too frequently by a single UE. For example, the processor 330 may monitor the identifier to locator mappings 370 in memory 340 to ensure that an ephemeral ID is not being used by a single UE more than a threshold number of times.

If the confirmation or mapping was successful, the NE receives a confirmation from the mapping system. If, however, the registration or mapping was unsuccessful, the NE obtains a new, randomly selected ephemeral ID. For example, the method returns back to block 803 if registration or mapping fails. In block 809, a communication session is established between the UE and a network site using the ephemeral ID. For example, UE 151A contacts network site 139 and establishes a communication session with network site 139 such that data is exchanged using the ephemeral ID.

Figure 9:
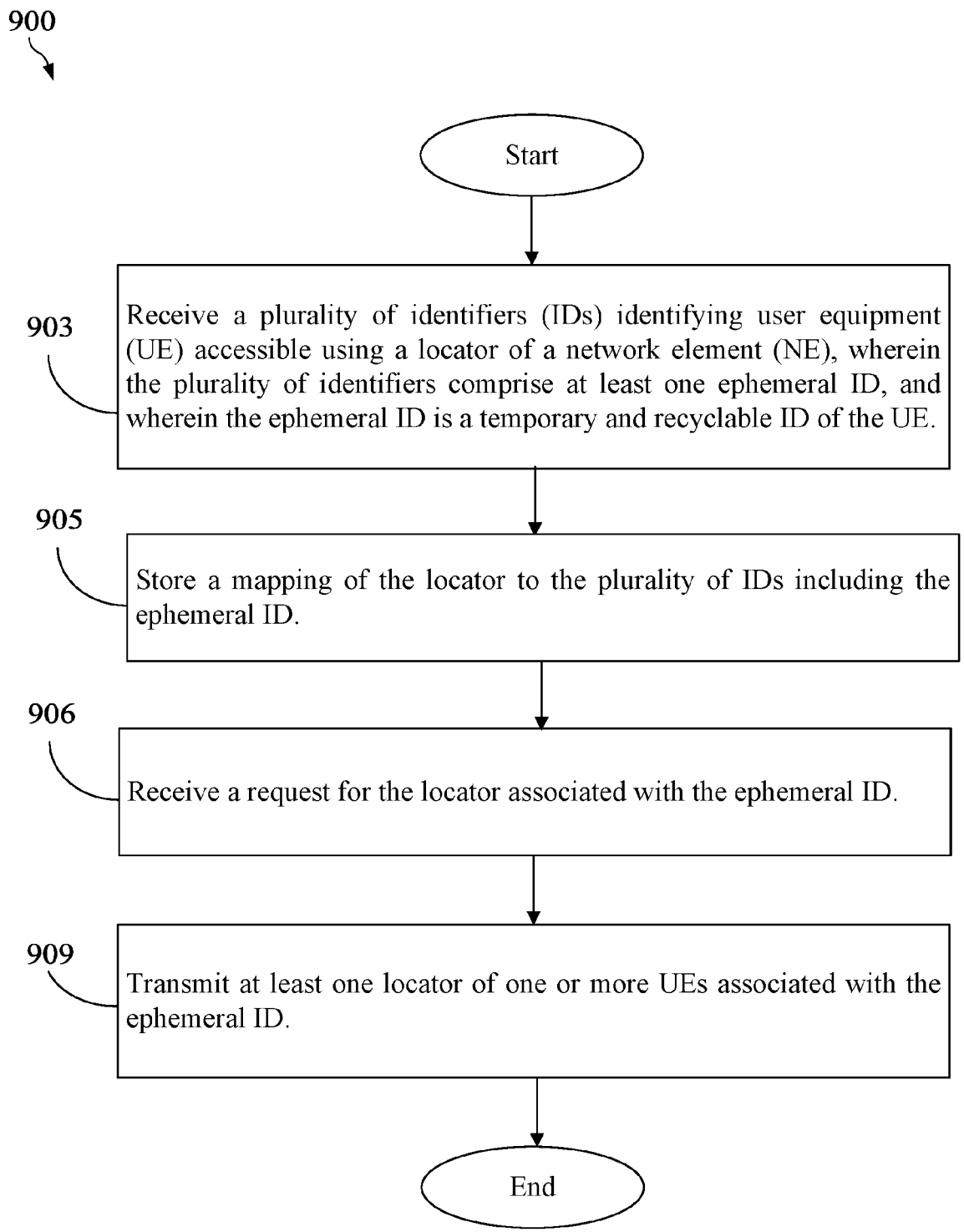
FIG. 9 is a method enabling anonymity of NEs in an ID oriented network.

FIG. 9 is a method 900 enabling anonymity of NEs in an ID oriented network. Method 900 may be implemented by an NE, similar to NE 300, in a network, similar to networks 200 or 700. For example, method 900 is implemented by a mapping server, such as mapping server 230, when a mapping server receives a register request from an NE. The NE may be a UE, such as the UE 151A or 151B, a network site, such as the network site 139 or 241, an xTR, such as xTRs 121, 124, 127, or 228, or a mobile node, such as mobile nodes 730, 733, 746, 749, 755, and 758. The mapping server may be similar to the mapping server 230 or the GNRS 740.

At block 903, a plurality of IDs identifying a UE accessible using a locator of a NE are received from the NE. For example, Rx 320 receives the IDs from the NE. The IDs comprise at least one ephemeral ID. The ephemeral ID may be EEIDs or EGUIDs that are temporary and recyclable. In an embodiment, a globally unique ID, such as an EID or a GUID, and a locator, such as an RLOC, is also received in association with the ephemeral ID. At block 905, a mapping of the locator to the plurality of IDs including the ephemeral ID is stored at the NE. In an embodiment, the ephemeral ID is saved in association with the locator of the NE in a memory 340 of the mapping server.

At block 906, a request for a locator associated with the ephemeral ID is received. For example, Rx 320 may receive a map request comprising the ephemeral ID, and the request is for a locator, such as the RLOC, of the NE through which the UE identified by the ephemeral ID can be reached. In an embodiment, the ID to locator mappings 370 is searched to find the locator associated with the ephemeral ID. In an embodiment, more than one locator may be identified for the ephemeral ID because the ephemeral ID is temporary and recyclable. That is, the ephemeral ID is not a globally unique ID of a particular UE and thus, cannot be sent to the mapping server with a reasonable expectation of success to find the accurate location of an UE. At block 909, at least one locator of one or more UEs associated with the ephemeral IDs is transmitted to the requesting NE. For example, the Tx 325 sends the at least one locator of the one or more UEs associated with the ephemeral ID to the requesting NE.

In an embodiment, the disclosure includes a means for obtaining an ephemeral ID for at least one UE accessible by the NE, wherein the ephemeral ID is a temporary and recyclable ID associated with the UE, a means for transmitting, to a mapping server, a request to map the ephemeral ID of the UE to a locator of the NE, and a means for establishing a communication session between the UE and a network site using the ephemeral ID.

In an embodiment, the disclosure includes a means for obtaining an ephemeral ID from within a predetermined range of available ephemeral IDs, wherein the ephemeral ID is a temporary and recyclable ID of the UE, a means for requesting that a mapping server register the ephemeral ID to a locator associated with the router, and a means for establishing a communication session between the UE and a network site using the ephemeral ID.

In an embodiment, the disclosure includes a means for receiving receive a plurality of IDs identifying a UE accessible using a locator of a second NE, wherein the plurality of IDs comprise at least one ephemeral ID, and wherein the ephemeral ID is a temporary and recyclable ID of the UE, a means for storing a mapping of the locator to the plurality of IDs including the ephemeral ID, a means for receiving a request for the locator associated with the ephemeral ID to a third NE, and a means for transmitting one or more locators associated with one or more UEs identified by the ephemeral ID to the third NE.

To prevent collisions or reduce the frequency of collisions when names are used, the ephemeral identifier may be randomized. A UE may use multiple ephemeral identifiers (e.g., EEID or EGUID) and a fixed identifier (e.g., EID or GUID) for different services at the same time. In an embodiment, the use of the ephemeral ID is transparent to other devices within the network or system and only the xTR and the UE/mobile node attached thereto know of the encapsulation at that specific moment. In addition, the changes in the ephemeral IDs will be extremely difficult to reverse engineer and determine the UE associated with the ephemerals IDs since there are so many ephemeral IDs that map to the same UE.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of communications in a network, comprising:
obtaining, by a user equipment (UE) having a globally unique identifier (ID) identifying the UE, an ephemeral ID identifying the UE, the ephemeral ID being a temporary and recyclable ID and provided to the UE for use in a limited lifetime;
transmitting, by the UE to a mapping server, a request to map the ephemeral ID of the UE to a locator of a network element (NE); and
communicating, by the UE with a network site using the ephemeral ID, the network site being associated with the NE.

2. The method of claim 1, wherein the network is one of a Locator/ID Separation Protocol (LISP) network or a Mobility First, eXpressive Internet Architecture (XIA) network.

3. The method of claim 1, wherein the ephemeral ID is obtained from within a predetermined range of ephemeral IDs.

4. The method of claim 1, further comprising:
establishing, by the UE, a second communication session between the UE and a second network site using the globally unique ID.

5. The method of claim 1, further comprising receiving, by the UE, a confirmation from the mapping server after the mapping server successfully maps the ephemeral ID to the locator of the NE.

6. The method of claim 1, wherein the network implements Locator/ID Separation Protocol (LISP), and wherein ephemeral ID is an End Point Identifier (EID) and the locator is a Routing Locator (RLOC).

7. The method of claim 1, the method further comprising obtaining, by the UE, one or more second ephemeral IDs identifying the UE, each of the one or more second ephemeral IDs being associated with a locator of a router by which the UE is accessible and being used by the UE in a limited lifetime.

8. A method for establishing communications in a network, comprising:
obtaining, by a network element (NE) in the network, a first ephemeral identifier (ID) identifying a user equipment (UE), the first ephemeral ID being a temporary and recyclable ID;
transmitting, by the NE to a mapping server, a request to map the first ephemeral ID of the UE to a routing locator (RLOC);
establishing, by the NE, a first communication session between the UE and a first network site using the first ephemeral ID; and
establishing, by the NE, a second communication session between the UE and a second network site using a second ephemeral ID.

9. A user equipment (UE), comprising:
a memory; and
a processor operably coupled to the memory and configured to:
obtain an ephemeral identifier (ID) identifying the UE, the UE having a globally unique ID identifying the UE as well as the ephemeral ID, the ephemeral ID being a temporary and recyclable ID and provided to the UE for use in a limited lifetime;
send a request to a mapping server to register the ephemeral ID to a locator associated with a router; and
establish a communication session between the UE and a network site using the ephemeral ID.

10. The UE of claim 9, wherein the ephemeral ID is an ephemeral End Point Identifier Address (EEID) or an ephemeral globally unique identifier (EGUID).

11. The UE of claim 9, wherein the UE is only permitted to use the ephemeral ID for the communication session between the UE and the network site such that a second UE is permitted to use the ephemeral ID for a second communication session after the communication session between the UE and the network site has terminated.

12. The UE of claim 9, wherein the network implements Locator/ID Separation Protocol (LISP), and wherein the mapping server comprising a memory configured to store locator-to-ephemeral ID mappings for a plurality of UEs in the network.

13. The UE of claim 9, wherein the mapping server is a global network routing services (GNRS) device comprising a memory configured to store locator-to-ephemeral ID mappings for a plurality of UEs in the network.

14. The UE of claim 9, wherein the processor is further configured to obtain one or more second ephemeral IDs identifying the UE, each of the one or more second ephemeral IDs being associated with a locator of a router by which the UE is accessible and being used by the UE in a limited lifetime.

15. A network element (NE), comprising:
a memory; and
a processor operably coupled to the memory and configured to:
obtain a first ephemeral identifier (ID) identifying a user equipment (UE), the first ephemeral ID being a temporary and recyclable ID;
transmit, to a mapping server, a request to map the first ephemeral ID of the UE to a routing locator (RLOC);
establish the first communication session between the UE and a first network site using the first ephemeral ID; and
establish a second communication session between the NE and a second network site using a second ephemeral ID different from the first ephemeral ID.

16. A mapping server, comprising:
a receiver configured to receive a plurality of identifiers (IDs) identifying a user equipment (UE) accessible using a locator of a first network element (NE), wherein the plurality of IDs comprise at least one ephemeral ID, and wherein the ephemeral ID is a temporary and recyclable ID of the UE;
a memory operably coupled to the receiver and configured to store a mapping of the locator to the plurality of IDs including the ephemeral ID, wherein the mapping of the locator to the plurality IDs comprises a mapping of an address of the first NE, a globally unique identifier (GUID), and an ephemeral GUID (EGUID), wherein the network is a Mobility First, eXpressive Internet Architecture (XIA);
wherein the receiver is further configured to receive a request for the locator associated with the ephemeral ID from a second NE; and a transmitter operably coupled to the memory and configured to transmit one or more locators associated with one or more UEs identified by the ephemeral ID to the second NE.

17. The mapping server of claim 16, wherein the receiver is further configured to receive a request for the locator associated with the GUID from the second NE, and wherein the transmitter is further configured to transmit the locator of the UE in response to receiving the request comprising the GUID to the second NE.

18. The mapping server of claim 16, wherein the transmitter is further configured to transmit at least two different locators associated with the ephemeral ID to the second NE, wherein the two different locators are stored in the memory of the mapping server in association with the ephemeral ID.

19. The mapping server of claim 16, wherein the network implements Locator/ID Separation Protocol (LISP), wherein the mapping of the locator to the plurality IDs comprises a mapping of a Routing Locator (RLOC) to an End Point Identifier (EID), and an ephemeral EID (EEID).

20. The mapping server of claim 16, further comprising a processor operably coupled to the memory, the receiver, and the transmitter, wherein the processor is further configured to monitor the memory to ensure that an ephemeral ID is not being used by a single UE more than a threshold number of times.

* * * * *